US011935499B2

(12) United States Patent
Qiao et al.

(10) Patent No.: US 11,935,499 B2
(45) Date of Patent: Mar. 19, 2024

(54) DISPLAY DEVICE DRIVER AND DRIVING METHOD THEREOF

(71) Applicant: TCL CHINA STAR OPTOELECTRONICS TECHNOLOGY CO., LTD., Guangdong (CN)

(72) Inventors: Hongyu Qiao, Guangdong (CN); Bo Xiao, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 262 days.

(21) Appl. No.: 16/960,698

(22) PCT Filed: Jun. 5, 2020

(86) PCT No.: PCT/CN2020/094637
§ 371 (c)(1),
(2) Date: Jul. 8, 2020

(87) PCT Pub. No.: WO2021/232501
PCT Pub. Date: Nov. 25, 2021

(65) Prior Publication Data

US 2022/0301513 A1 Sep. 22, 2022

(30) Foreign Application Priority Data

May 20, 2020 (CN) ......................... 202010429453.1

(51) Int. Cl.
*G09G 3/36* (2006.01)

(52) U.S. Cl.
CPC ... *G09G 3/3685* (2013.01); *G09G 2310/0272* (2013.01); *G09G 2310/08* (2013.01); *G09G 2320/041* (2013.01); *G09G 2330/021* (2013.01)

(58) Field of Classification Search
CPC ......... G09G 2330/021; G09G 320/041; G09G 2310/08; G09G 2310/0272; G09G 3/3685
See application file for complete search history.

(56) References Cited

U.S. PATENT DOCUMENTS

| | | | | |
|---|---|---|---|---|
| 2008/0238839 | A1* | 10/2008 | Kim | G09G 3/3426 345/83 |
| 2016/0125782 | A1 | 5/2016 | Park et al. | |
| 2016/0358526 | A1* | 12/2016 | Wang | G09G 3/3208 |
| 2020/0357344 | A1* | 11/2020 | Pyun | G09G 3/3275 |

FOREIGN PATENT DOCUMENTS

| | | | |
|---|---|---|---|
| CN | 103366707 | A | 10/2013 |
| CN | 106448579 | A | 2/2017 |
| CN | 106710563 | A | 5/2017 |
| CN | 107146592 | A | 9/2017 |
| CN | 110335570 | A | 10/2019 |
| CN | 110969980 | A | 4/2020 |
| JP | 2011154105 | A | 8/2011 |

* cited by examiner

*Primary Examiner* — Doon Y Chow
(74) *Attorney, Agent, or Firm* — Harness, Dickey & Pierce, P.L.C.

(57) ABSTRACT

A display device driver and a driving method thereof are provided. The display device driver includes a display panel, a source driver, and a timing control chip, wherein the display panel is configured to present at least two load types of display images, the source driver is signally connected to the display panel, and the timing control chip includes a data detection module and a data processing module.

14 Claims, 3 Drawing Sheets

DISPLAY DEVICE DRIVER AND DRIVING METHOD THEREOF

CROSS-REFERENCE TO RELATED APPLICATION

This application is a 371 U.S. National Phase of International Application No. PCT/CN2020/094637 filed Jun. 5, 2020. The entire disclosure of the above application is incorporated herein by reference.

FIELD OF INVENTION

The present disclosure relates to the field of display technology, and more particularly, to a display device driver and a driving method thereof.

BACKGROUND OF INVENTION

Liquid crystal displays (LCDs) have many advantages such as thin body, power saving, no radiation, etc. They have been widely used in LCD TVs, smart phones, digital cameras, tablet computers, computer images, or notebook computer images, etc., dominating the field of flat panel displays.

Thin film transistors (TFTs) are main driving elements in current liquid crystal display devices, and directly relate to display performance of flat panel display devices. Most of the LCDs in the current market are backlight type LCDs, which include a liquid crystal display panel and a backlight module. The operation principle of a liquid crystal display panel is to inject liquid crystal molecules between a TFT substrate and a color filter (CF) substrate, and apply a pixel voltage and a common voltage separately on the two substrates to control a rotational direction of the liquid crystal molecules by an electric field formed between the pixel voltage and the common voltage, so as to transmit light of the backlight module to generate a display picture.

As people continue to pursue display quality, high refresh rate (such as 120 HZ) and high image quality (such as 8K) LCDs will inevitably become a future development trend. However, high refresh rate and high image quality LCD panels will inevitably cause an increasing load on a circuit board and source driver, and increase a temperature of a device, thereby causing damage to the device. In order to realize light and dark alternating pixels of adjacent rows, a heavy-load image will also cause a large amount of current consumption and increase power consumption. In order to achieve a high-quality heavy-load image, a same current as the heavy-load image can only be used when running a light-load image, which will further increase the load of the device.

At present, there are following measures to reduce the temperature of the device:

In terms of hardware, a layout of the hardware is optimized by increasing a size of the circuit board and thickening a board layer, but this measure is limited to a size of internal space of the display device. In addition, increasing the size and number of layers of the circuit board or selecting a higher specification device will have additional costs.

In terms of software, a light load type inversion method is used to reduce an output voltage VAA, etc., but this method will affect product style.

SUMMARY OF INVENTION

An object of the present disclosure is to provide a display device driver and a driving method thereof to solve the problems of increased load, increased operating temperature, and increased power consumption of the driving device in the display device driver of the prior art.

In order to achieve the above object, the present disclosure provides a display device driver. The display device driver includes a display panel, a source driver, and a timing control chip.

The display panel is configured to present at least two load types of display images. The source driver signal is signal-connected to the display panel. The timing control chip includes a storage module, a data detection module, and a data processing module.

The storage module is configured to pre-store preset data of the display images. The data detection module is configured to obtain a real-time data of the display image, to compare the real-time data with the preset data, to determine a load type of the display images corresponding to the real-time data, and to generate a judgment result. The data processing module is signal-connected to the source driver, and the data processing module sends a control signal to the source driver according to the judgment result of the data detection module. The source driver provides a corresponding pumping current to the display panel according to the control signal.

Further, the source driver includes a data selector that selects the corresponding pumping current correspondingly according to the control signal send by the data processing module.

Further, the display images include a light-load image and a heavy-load image according to the load types of the display images.

The control signal includes a first control signal and a second control signal. The first control signal corresponds to the heavy-load image. The second control signal corresponds to the light-load image.

The data processing module sends the first control signal to the source driver when the data detection module determines that the display image is a heavy-load image; and the data processing module sends the second control signal to the source driver when the data detection module determines that the display image is a light-loaded image.

Further, the pumping current includes a first pumping current and a second pumping current. The first pumping current corresponds to the first control signal. The second pumping current corresponds to the second control signal.

The source driver provides the first pumping current to the display panel when the data processing module sends the first control signal to the source driver; the source driver provides the second pumping current to the display panel when the data processing module sends the second control signal to the source driver.

Further, a value of the second pumping current is less than a value of the first pumping current.

Further, the display device driver further includes a pulse width modulation chip connected to the source driver and is configured to provide a voltage signal.

The present disclosure also provides a display device driver driving method, which includes the following driving steps:

- a timing control chip obtaining real-time data of a display images, comparing the real-time data with preset data, generating a judgment result, and transmitting the judgment result to a data processing module by data detection module;
- outputting a control signal according to the judgment result, and transmitting the control signal to a source driver by the data processing module; and providing a corresponding pumping current to a display panel according to the control signal by the source driver.

Further, the display device driver driving method further including: obtaining the real-time data of the display panel, and retrieving the preset data in a storage module, comparing the real-time data with the preset data, obtaining the judgment result after comparing, and transmitting the judgment result to the data processing module by the data detection module.

Further, sending the control signal according to the judgment result of the data detection module by the data processing module: sending a first control signal to the source driver by the data processing module when the data detection module determines that the display image is a heavy-load image; and sending a second control signal to the source driver by the data processing module when the data detection module determines that the display image is a light-load image.

Further, providing a corresponding pumping current according to the control signals by a data processor of a source processor further includes: providing a first pumping current to the display panel by the source driver when the data processing module sends the first control signal to the source driver; and providing a second pumping current to the display panel by the source driver when the data processing module sends the second control signal to the source driver.

The present disclosure also provides a display device including the display device driver described above.

The advantages of the present disclosure are: in the display device driver and the driving method thereof according to the present disclosure, by detecting the load type of the display images to select a corresponding pumping current, an energy consumption of the display panel is decreased when operating a light-load image, while the load of each device is reduced in the display device driver to achieve the purpose of reducing the temperature of the device.

DESCRIPTION OF FIGURES

In order to explain the embodiments or the technical solutions in the prior art more clearly, the following will briefly introduce the figures required in the description of the embodiments or the prior art. Obviously, the figures in the following description are only for some embodiments of the present disclosure, those of ordinary skill in the art can obtain other figures based on these figures without any inventive steps.

DETAILED DESCRIPTION OF PREFERRED EMBODIMENTS

Figure 1:
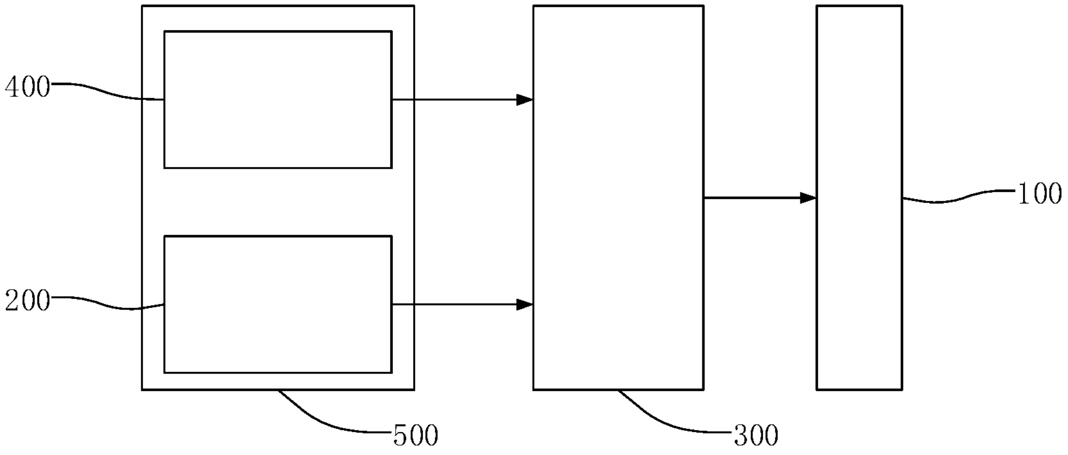
FIG. 1 is a schematic diagram of connection of a display device driver in one embodiment of the present disclosure.

The following describes preferred embodiments of the present disclosure with reference to the accompanying figures of the specification to prove that the present disclosure can be implemented. The embodiments can fully introduce the present disclosure to those skilled in the art to make its technical content clearer and easier to understand. The present disclosure can be embodied by many different forms of embodiments, and the protection scope of the present disclosure is not limited to the embodiments mentioned herein.

In the figures, components with the same structure are denoted by the same numerals, and components with similar structures or functions are denoted by similar numerals. The size and thickness of each component shown in the figures are arbitrarily shown, and the present disclosure does not limit the size and thickness of each component. In order to make the illustration clearer, the thickness of the components is exaggerated in some parts of the figures.

In addition, the following descriptions of the embodiments of the invention refer to additional figures to illustrate specific embodiments that can be implemented by the present disclosure. Directional terms mentioned in the present disclosure, for example, upper, lower, front, rear, left, right, inner, outer, side, etc., only refers to the directions of the attached figures. Therefore, the directional terms are used for better and clearer description and understanding of the present disclosure, rather than indicating or implying that the device or element referred to must have a specific orientation, construction and operation with a specific orientation, therefore cannot be understood as a limitation of the present disclosure. In addition, the terms first, second, third, etc. are used for descriptive purposes only and cannot be understood as indicating or implying relative importance.

A certain component may be disposed directly on another component, or may also be disposed on an intermediate component which disposed on another component when the certain component is described as "disposed on another component". When a component is described as "mounted to" or "connected to" another component, the two can be understood to be "mounted to" or "connected" directly, or may also be understood that a component indirectly "mounted to" or "connected to" another component through the intermediate component.

Embodiments of the present disclosure provide a display device that uses liquid crystal display (LCD) display technology, which can be a device with a display image function such as a notebook computer, a mobile phone, a tablet computer, or a television.

The display device has a display panel 100, and the display panel 100 provides display images to the display device. The display images include a heavy-load image and a light-load image according to the type of the load types, wherein a current and voltage required by the light-load image are less than a current and voltage required by the heavy-loaded image.

The display device also has a display device driver. As shown in FIG. 1, the display device driver includes a timing control chip 200, a source driver 300, and a pulse width modulation chip 400, wherein the timing control chip 200 and the pulse width modulation chip 400 are provided on the same circuit board 500.

Figure 2:
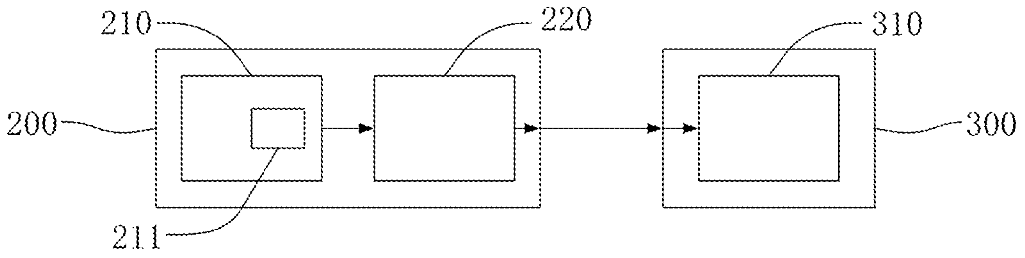
FIG. 2 is a schematic diagram of connection between a timing control chip and a source driver in one embodiment of the present disclosure.

The timing control chip 200 is connected to the source driver 300. As shown in FIG. 2, the timing control chip 200 includes a storage module 211, a data detection module 210, and a data processing module 220. The storage module 211 is connected to the data detection module 210, and the storage module 211 configured to store preset data of the display images. The data detection module 210 is connected to the data processing module 220, which is configured to obtain a real-time data of the display images, retrieve the preset data stored in the storage module 211, and compare the real-time data with the preset data to determine a load type of the real-time data of the display images to generate a judgment result, and then send the judgment result to the data processing module 220, and also transmit the real-time data of the display images to the data processing module 220.

The data processing module 220 correspondingly generate a control signal according to the judgment result sent by the data detection module 210, and transmits the control signal and the real-time data of the display images to the source driver 300, wherein the control signal includes a first control signal and a second control signal. The first control signal corresponds to the heavy-load image, and the second control signal corresponds to the light-load image.

The data processing module 220 sends the first control signal to the source driver 300 when the data detection module 210 determines that the display image is a heavy-load image, and sends the determined result to the data processing module 220. The data processing module 220 sends the second control signal to the source driver 300 when the data detection module 210 determines that the display image is a light-load image, and sends the determined result to the data processing module 220.

The source driver 300 is connected to the timing control chip 200. As shown in FIG. 2, it includes a data selector 310. The data selector 310 selects the pumping current correspondingly according to the control signal transmitted from the timing control chip 200, wherein the pumping current includes a first pumping current and a second pumping current, and a value of the first pumping current is greater than a value of the second pumping current.

The data selector 310 selects the first pumping current when the data processing module 220 sends the first control signal. The data selector 310 selects the second pumping current when the data processing module 220 sends the second control signal.

The display panel 100 is connected to the source driver 300, and the source driver 300 transmits a corresponding pumping current for the display panel 100, so that the display panel 100 reaches a voltage which meet the requirement of displaying the image as soon as possible, while the source driver 300 also transmits the real-time data of the display images from the timing control chip 200 to the display panel 100, so that the display panel 100 displays the heavy-load image or the light-load image according to the real-time data of the display images.

The pulse width modulation chip 400 is connected to the source driver 300 and configured to provide voltage signals such as VAA and DVDD to the source driver 300.

Figure 3:
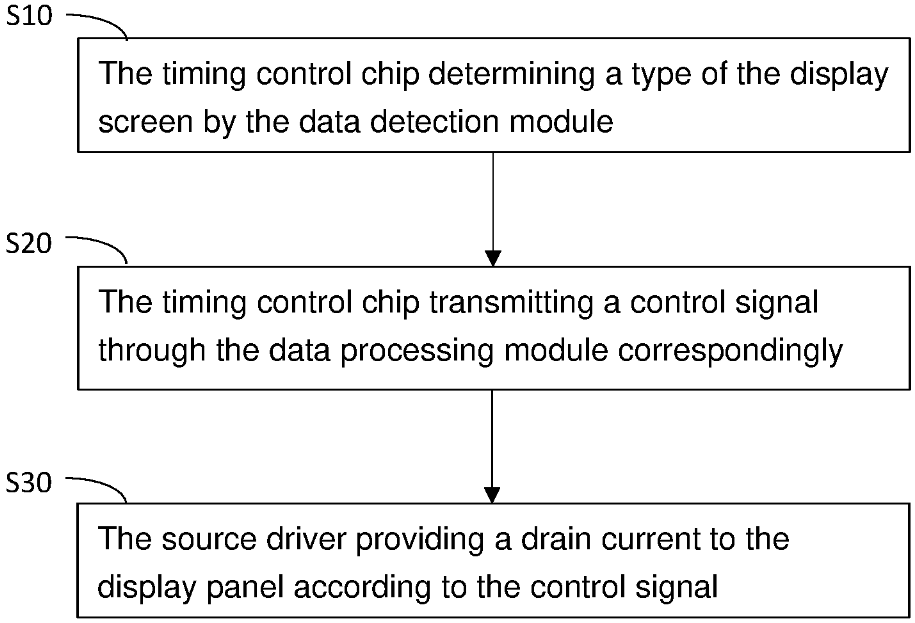
FIG. 3 is a schematic flowchart of a display driving method in one embodiment of the present disclosure.

One embodiment of the present disclosure also provides a driving method for driving the display device driver described above. The driving method is shown in FIG. 3, which includes the following steps:

Step S10, the timing control chip 200 determining a type of the display images by the data detection module 210, including:

the data detection module 210 obtaining a real-time data of the display images and retrieving the preset data in the storage module 211, comparing the real-time data with the preset data, judging whether the display image is the heavy-load image or the light-load image to generate a judgment result, and transmitting the judgment result to the data processing module 220. At the same time, transmitting the real-time data of the display images to the data processing module 220.

Step S20, the timing control chip 200 transmitting the control signal through the data processing module 220 correspondingly, including:

the data processing module 220 correspondingly transmitting control signal to the source driver 300 according to the judgment result of the data detection module 210. The control signal includes a first control signal and a second control signal. The data processing module 220 transmits the first control signal to the source driver 300 when the data detection module 210 determines that the display image is a heavy-load image. The data processing module 220 transmits the second control signal to the source driver 300 when the data detection module 210 determines that the display image is a light-load image.

At the same time, the data processing module 220 also transmits the real-time data of the display images from the data detection module 210 to the source driver 300; the pulse width modulation chip 400 transmits voltage signals such as VAA and DVDD to the source driver 300.

Step S30, the source driver 300 providing a pumping current to the display panel 100 according to the control signal correspondingly, including:

the data selector 310 of the source driver 300 selecting a pumping current correspondingly to provide into the display panel 100 according to the control signal output by the timing control chip 200. The pumping current includes a first pumping current and a second pumping current. The data selector 310 provides a first pumping current to the display panel 100 when the timing control chip 200 transmits the first control signal, a value of the first pumping current is greater than a value of the second pumping current, thereby enabling the display panel 100 to reach the voltage required in the heavy-load image faster. The data selector 310 provides a second pumping current to the display panel 100 when the timing control chip 200 transmits the second control signal, and a value of the second pumping current is less than a value of the first pumping current, thereby saving energy when the display panel 100 displays a light-load image, reducing the load of each device in the display device driver, and preventing each device from being damaged due to the increased temperature caused by heavy load.

At the same time, the source driver 300 transmits the real-time data of the display images output from the timing control chip 200 to the display panel 100, so that the display panel 100 displays the heavy-load image or the light-load image according to the real-time data of the display images.

In the display device driver and the driving method thereof provided in the embodiments of the present disclosure, by detecting the load type of the display images to select a corresponding pumping current, energy consumption of the display panel is decreased when operating a light-load image, while the load of each device is reduced in the display device driver, so as to achieve the purpose of reducing the temperature of the device.

In the embodiment of the present disclosure, the display panel 100 has two load type display images, but in other embodiments of the present disclosure, three load type display images, four load type display images, and more than four load type display images are also provided, wherein a number of the types of the control signal and the pumping current can also be increased or decreased according to the load type of the display images, but the driving principle and driving operation flow are the same as those in the embodiments of the present disclosure. Hence, further details shall not be described here. According to the embodiments of the present disclosure, all other embodiments obtained by a person of ordinary skill in the art without any inventive steps are fall within the protection scope of the present disclosure.

Although the present disclosure is described herein with reference to specific embodiments, it should be understood that these embodiments are merely examples of the principles and applications of the present disclosure. It should therefore be understood that many modifications can be made to the exemplary embodiments, and other arrangements can be devised as long as they do not depart from the spirit and scope of the present disclosure as defined by the appended claims. It should be understood that different dependent claims and the features described herein may be combined in ways other than those described in the original claims. It can also be understood that the features described in conjunction with the individual embodiments can be used in other described embodiments.

What is claimed is:

1. A display device driver, comprising:

a display panel configured to display at least two load types of display images;

a source driver signally connected to the display panel; and a timing control chip connected to the source driver, comprising:

a storage module configured to pre-store preset data of the display images;

a data detection module configured to retrieve the preset data from the storage module and obtain real-time data of the display images, configured to compare the real-time data with the preset data to determine the load type of the real-time data of the display images to generate a judgment result, and configured to transmit the judgment result and the real-time data to a data processing module; and the data processing module signally connected to the source driver, wherein the data processing module is configured to generate a control signal based on the judgment result, and transmit the control signal and the real-time data to the source driver;

wherein the source driver is configured to select and provide a pumping current to the display panel according to the control signal and transmit the real-time data to the display panel, to enable the display panel to display the display images according to the real-time data, and wherein the real-time data transmitted to the data processing module is same as the real-time data obtained by the data detection module, and the real-time data transmitted to the source driver is the same as the real-time data obtained by the data detection module.

2. The display device driver as claimed in claim 1, wherein the source driver comprises a data selector configured to select the pumping current according to the control signal.

3. The display device driver as claimed in claim 1, wherein:

the display images comprise a light-load image and a heavy-load image according to the load types of the display images; and the control signal comprises:

a first control signal corresponding to the heavy-load image; and a second control signal corresponding to the light-load image;

wherein the data processing module sends the first control signal to the source driver when the data detection module determines that the display image is the heavy-load image; and wherein the data processing module sends the second control signal to the source driver when the data detection module determines that the display image is the light-load image.

4. The display device driver as claimed in claim 3, wherein the pumping current comprises:

a first pumping current corresponding to the first control signal; and a second pumping current corresponding to the second control signal;

wherein the source driver provides the first pumping current to the display panel when the data processing module sends the first control signal to the source driver; and wherein the source driver provides the second pumping current to the display panel when the data processing module sends the second control signal to the source driver; and wherein a value of the second pumping current is less than a value of the first pumping current.

5. The display device driver as claimed in claim 1, further comprising:

a pulse width modulation chip connected to the source driver to provide a voltage signal.

6. A display device driver driving method, comprising following steps:

a timing control chip obtaining real-time data of display images of a display panel, comparing the real-time data with preset data to determine a load type of the real-time data of the display images to generate a judgment result, and transmitting the judgment result and the real-time data to a data processing module by a data detection module;

generating a control signal according to the judgment result, and transmitting the control signal and the real-time data to a source driver by the data processing module; and selecting and providing a pumping current to the display panel according to the control signal and transmitting the real-time data to the display panel by the source driver, to enable the display panel to display the display images according to the real-time data, wherein the real-time data transmitted to the data processing module is same as the real-time data obtained by the data detection module, and the real-time data transmitted to the source driver is the same as the real-time data obtained by the data detection module.

7. The display device driver driving method as claimed in claim 6, further comprising:

retrieving the preset data from a storage module.

8. The display device driver driving method as claimed in claim 6, wherein the step of generating the control signal according to the judgment result by the data processing module comprises:

generating a first control signal by the data processing module when the data detection module determines that the display image is a heavy-load image; and generating a second control signal by the data processing module when the data detection module determines that the display image is a light-load image.

9. The display device driver driving method as claimed in claim 8, wherein the step of providing the pumping current to the display panel according to the control signal by the source driver comprises:

providing a first pumping current to the display panel by the source driver when the data processing module transmits the first control signal to the source driver; and providing a second pumping current to the display panel by the source driver when the data processing module transmits the second control signal to the source driver.

10. A display device comprising the display device driver, wherein the display device driver comprising:

a display panel configured to display at least two load types of display images;

a source driver signally connected to the display panel; and a timing control chip connected to the source driver, comprising:

a storage module configured to pre-store preset data of the display images;

a data detection module configured to retrieve the preset data from the storage module and obtain real-time data of the display images, configured to compare the real-time data with the preset data to determine the load type of the real-time data of the display images to generate a judgment result, and configured to transmit the judgment result and the real-time data to a data processing module; and the data processing module signally connected to the source driver, wherein the data processing module is configured to generate a control signal based on the judgment result, and transmit the control signal and the real-time data to the source driver;

wherein the source driver is configured to select and provide a pumping current to the display panel according to the control signal and transmit the real-time data to the display panel, to enable the display panel to display the display images according to the real-time data, and wherein the real-time data transmitted to the data processing module is same as the real-time data obtained by the data detection module, and the real-time data transmitted to the source driver is the same as the real-time data obtained by the data detection module.

11. The display device as claimed in claim 10, wherein the source driver comprises a data selector configured to select the pumping current according to the control signal.

12. The display device as claimed in claim 10, wherein:

the display images comprise a light-load image and a heavy-load image according to the load types of the display images; and the control signal comprises:

a first control signal corresponding to the heavy-load image; and a second control signal corresponding to the light-load image;

wherein the data processing module sends the first control signal to the source driver when the data detection module determines that the display image is the heavy-load image; and wherein the data processing module sends the second control signal to the source driver when the data detection module determines that the display image is the light-load image.

13. The display device as claimed in claim 12, wherein the pumping current comprises:

a first pumping current corresponding to the first control signal; and a second pumping current corresponding to the second control signal;

wherein the source driver provides the first pumping current to the display panel when the data processing module sends the first control signal to the source driver; and wherein the source driver provides the second pumping current to the display panel when the data processing module sends the second control signal to the source driver; and wherein a value of the second pumping current is less than a value of the first pumping current.

14. The display device as claimed in claim 10, further comprising:

a pulse width modulation chip connected to the source driver to provide a voltage signal.

* * * * *